United States Patent
Yates

(10) Patent No.: US 6,402,101 B1
(45) Date of Patent: *Jun. 11, 2002

(54) FORMABLE MOUSE PAD

(75) Inventor: Paul M. Yates, LaCanada, CA (US)

(73) Assignee: Trico Sports, Inc., Pacoima, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,629

(22) Filed: Nov. 10, 1999

Related U.S. Application Data

(60) Division of application No. 09/143,896, filed on Aug. 31, 1998, now Pat. No. 6,082,683, which is a continuation-in-part of application No. 08/856,744, filed on May 15, 1997, now Pat. No. 5,932,046, which is a continuation-in-part of application No. 08/652,692, filed on May 30, 1996, now Pat. No. 5,679,193.

(51) Int. Cl.[7] ................................................. B43L 15/00

(52) U.S. Cl. ............................ 248/118.1; 2/20; 602/6

(58) Field of Search .......................... 602/5, 6, 21; 2/20; 248/118, 118.1

(56) References Cited

U.S. PATENT DOCUMENTS

| | | | | |
|---|---|---|---|---|
| 5,131,614 A | * | 7/1992 | Garcia et al. | 248/118 |
| 5,562,270 A | * | 10/1996 | Montague | 248/118.1 |
| 5,566,913 A | * | 10/1996 | Prokop | 248/118 |
| 5,628,483 A | * | 5/1997 | Smith et al. | 248/118 |
| 5,820,968 A | * | 10/1998 | Kurani | 428/137 |
| 6,050,964 A | * | 4/2000 | Yates | 602/5 |
| 6,082,683 A | * | 7/2000 | Yates | 248/118.1 |

* cited by examiner

Primary Examiner—Michael W. Ball
Assistant Examiner—Gladys Piazza
(74) Attorney, Agent, or Firm—Walter A. Hackler

(57) ABSTRACT

A formable cushion is produced by providing a mold having a first cavity and the second cavity in a fluid communication with one another, with the first cavity having a greater depth than the second cavity. A first volume of foam/gel is deposited into the first and second cavities in an amount providing a level surface of foam/gel. The level surface is covered with a formable sheet and the second volume of foam/gel is disposed onto the formable sheet. Thereafter, heat and pressure applied to the first and second volume of foam/gel within the mold in order to provide a cushion having a relatively firm back pliable layer, a relatively firm mouse pad and a conjoining relatively soft compressible cushion.

4 Claims, 4 Drawing Sheets

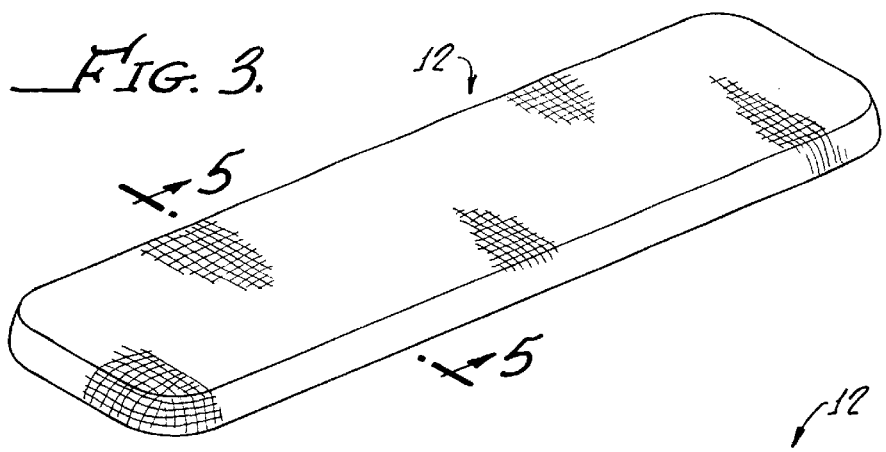
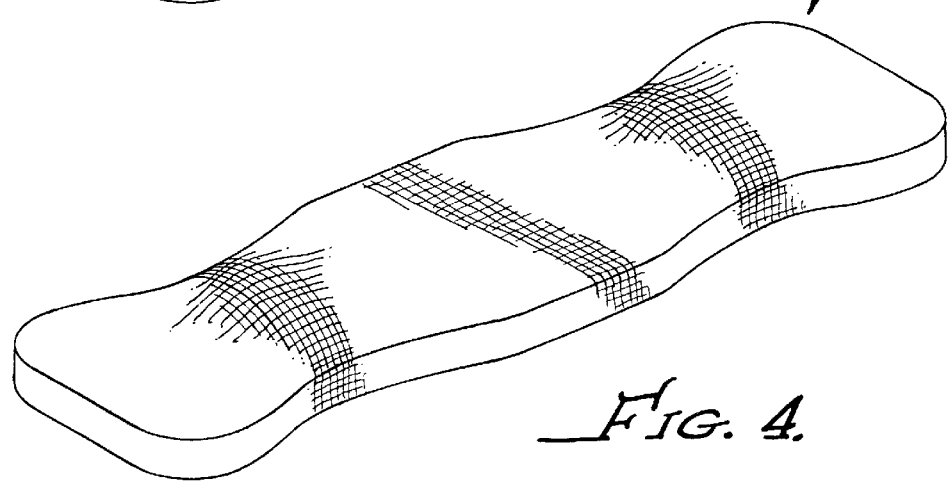
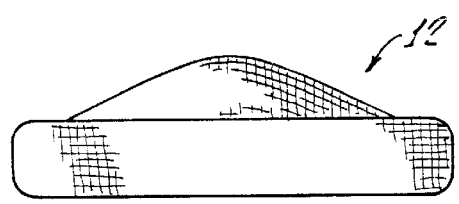
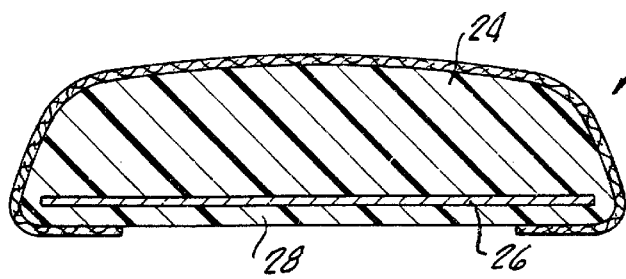

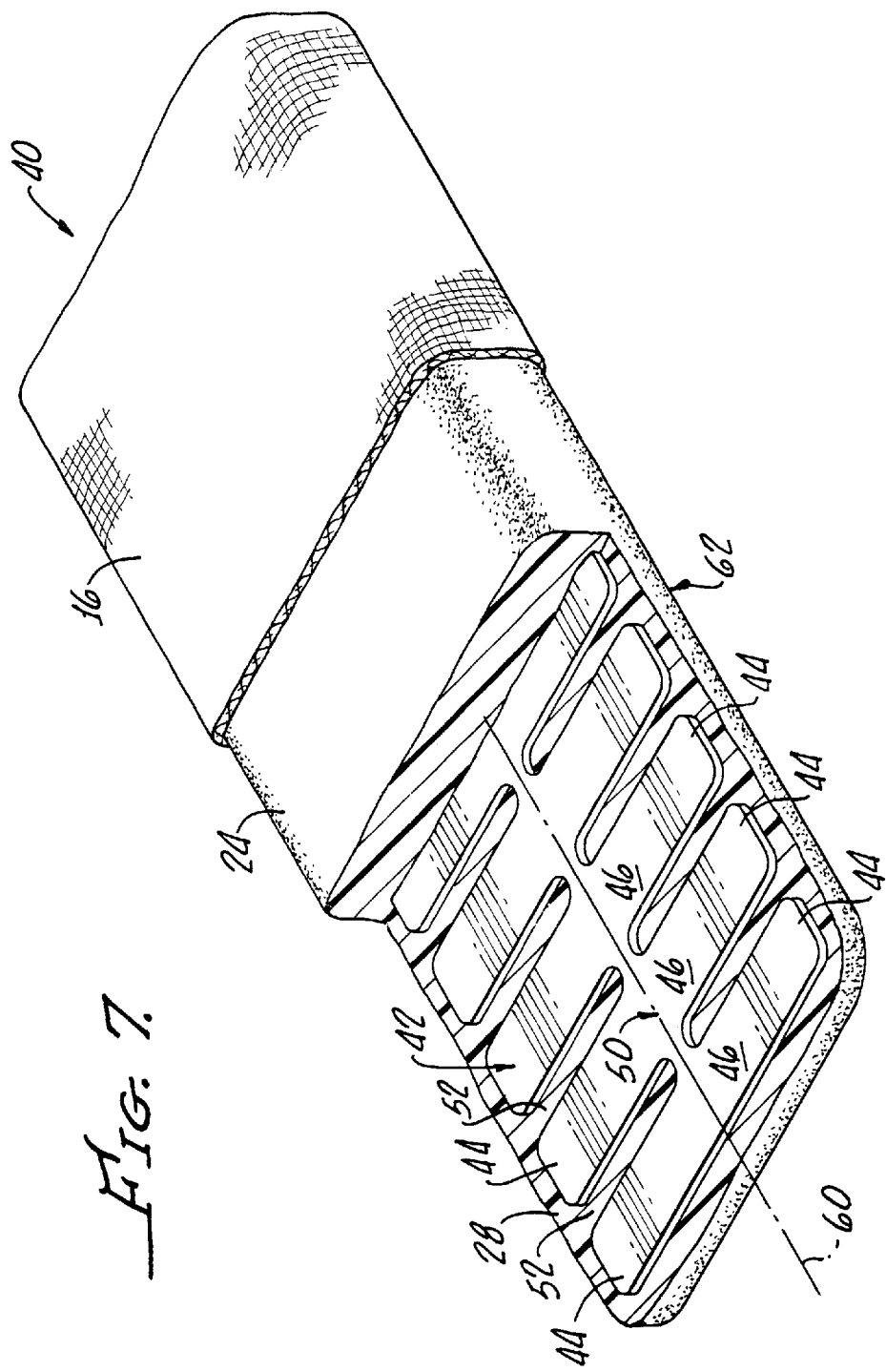

FORMABLE MOUSE PAD

This aplication is a division of U.S. patent application Ser. No. 09/143,896, filed Aug. 31, 1998 now U.S. Pat. No. 6,082,683, which is a continuation-in-part of U.S. Ser. No. 08/856,744, filed May 15, 1997, now U.S. Pat. No. 5,952,046, which is a continuation-in-part of U.S. Ser. No. 08/652,692, filed May 30, 1996, now U.S. Pat. No. 5,679,193.

The present invention generally relates to cushions and a method of making seamless support cushions.

A recent surge in the number of wrist and arm occupational injuries, resulting from repetitive computer keyboard use, has prompted the development of countless devices directed at alleviating this modern problem. "Carpal Tunnel Syndrome" has become a well known term describing a group of symptoms, including tendinitis, and epicondylitis, that occurs as a result of repetitive flexion of the wrist joints. Not only are the symptoms of Carpal Tunnel Syndrome extremely painful, they have the potential to be permanently debilitating. Fortunately, it has been found that if the causes of the disease are minimized or eliminated in time, further damage therefrom may be averted.

Wrist wraps, directed at immobilizing the wrist joint, and wrist supports, directed at propping the hand at a position which minimizes repetitive wrist flexion, have been heretofore developed. These devices are used extensively by data entry personnel and other keyboard operators in order to prevent wrist and arm injuries.

The present invention is directed at an inexpensive method for manufacturing gel and/or foam cushions that may be used as highly effective, comfortable wrist supports. In a broad sense, the method may be used to produce gel or foam cushions for other uses. In addition to providing a soft support gel or foam cushion in accordance with the present invention, it is formable. That is, the cushion can be bent, twisted or contoured to a desired shape to fit the needs of a user. This formation of the cushion by such bending, twisting or the like, is maintained by the cushion, hence the cushion is formable to a desired shape.

Some prior art wrist supports, though designed to minimize repetitive wrist flexion, tend to be uncomfortable to use after a period of time. Notably, because such devices cannot be positioned or oriented for conforming and supporting the underside of a user's wrist, at a proper angle, flow of blood to the wrist may be impeded. A number of prior art wrist supports utilize foam materials, such as foam rubber. Unfortunately, the resiliency of the foam alone does not provide proper support for the wrist.

Cushioning devices having liquid or gel filled bladders have been developed in the attempt to provide a more comfortable, more durable support for the wrist than is possible with solid or foam rubber supports. For example, U.S. Pat. No. 5,435,508 discloses a wrist rest support comprising a viscous, fluid-filled bladder removably inserted in a machine washable outer covering.

This prior art device, and others which are similar thereto, are manufactured by several independent steps, including sewing or other means of assembling the bladder, filling the bladder with the desired liquid, sealing the bladder such that it will resist leakage, and fashioning an outer covering in which to enclose the liquid filled bladder. However, as is the case with foam only suports, gel only wrist supports also do not provide proper angular wrist supports.

The present invention provides a substantially less complicated process for manufacturing a comfortable fabric covered cushion that includes all the advantages of a liquid support medium. Although the method of the present invention produces a fabric covered gel/foam cushion, no sewing, sealing or gluing is required in the process of making the cushion.

Notably, because a cushion manufactured in accordance with the present invention does not include a fluid filled bladder, there is no possibility that jewelry worn by the operator will rupture the cushion and cause leakage of its contents.

Furthermore, a cushion in accordance with the present invention is seamless due to the unique method of manufacturing same, thus eliminating the possibility of the cushion snagging delicate clothing that may be worn by the keyboard operator.

A cushion made in accordance with the method of the present invention will adhere to any typical surface on which it is placed, for example, a desk top. This eliminates potential frustration suffered by a keyboard operator who must contend with a wrist support that migrates and slips along the desk top due to the natural movement of the operator's hand and arm. Notably, the cushion requires no additional components to affix, clamp or secure the cushion to a surface. The cushion may be quickly and easily removed, and its position readjusted as desired, for example, when being used by more than one user.

Overall, the present invention provides an inexpensive method of manufacturing a comfortable, durable cushion.

Of most importance, the present invention provides not only all of the desirable features hereinabove enumerated, but also includes the ability of being formed, by a user, to a shape which provides individual comfort for the use. That is, proper angular wrist support.

SUMMARY OF THE INVENTION

A formable cushion in accordance with the present invention generally includes a cushion produced by coating one side of a stretchable fabric with gel or foam in order to make the fabric resistant to passage of air therethrough and disposing the coated fabric over a mold adapted for vacuum forming of the coated fabric.

The vacuum is applied between the coated fabric and the mold to cause an imminent contact between another side of the coated fabric and the mold by stretching of the fabric. A first additional volume of gel or foam is deposited on the fabric coating while the vacuum is being applied in order to cause bonding between the first additional volume and the coated fabric. A formable member is then disposed on to the first additional volume of gel or foam and a second additional volume of gel or foam is disposed on the formable member which may be a metal plate.

After the first and second additional volumes of gel or foam are allowed to solidify, the solidified gels or foams with the metal plate therebetween and the coated fabric fixed thereto are removed from the mold in order to obtain a formable cushion.

In an alternative embodiment of the present invention, a formable cushion is produced by disposing a film over a mold adapted for vacuum forming of the film and applying the vacuum between the film and the mold to cause intimate contact between the mold and the film. Thereafter, a first volume of foam/gel is deposited on the film while vacuum is being applied in order to enable the foam/gel to intimately contact the film. A formable sheet is then disposed onto the first volume of foam/gel and thereafter a second volume of foam/gel is disposed over the formable sheet.

After allowing the first and second volumes of the foam/gel to solidify, the solidified foam/gels with the formable sheet therebetween are removed from the mold in order to obtain a formable gel cushion.

In yet another embodiment of the present invention, the film may not be utilized and the foam/gel cushion is produced by depositing a first volume of foam/gel into a mold with the first volume of foam/gel comprising a foam/gel solidifying to a relatively soft compressible layer upon heating thereof. A formable sheet is then disposed onto the first volume of foam/gel and a second volume of foam/gel is deposited onto the formable sheet. The second volume of foam/gel comprises a foam/gel solidified to a relatively firm pliable back layer.

Thereafter, the mold is heated to solidify the first and second volumes foam/gel and the solidified foam/gel is removed from the mold with the formable sheet therebetween in order to obtain the formable cushion.

In yet another embodiment of the present invention, a formable cushion is produced by providing a mold having a first cavity and a second cavity in fluid communication with one another, with the first cavity having a greater depth than the second cavity.

A first volume of foam/gel is deposited into the first and second cavities in an amount providing a level surface of foam/gel.

The level surface of foam/gel is then covered with a formable sheet and a second volume of foam/gel is disposed onto the formable sheet.

Thereafter heat and pressure applied to the first and second volumes of the foam/gel within a mold with the formable sheet providing a barrier to compression of the foam/gel deposit in the first cavity which results in the second volume of foam/gel solidifying to a relatively firm pliable back layer, with the first volume of foam/gel in the second cavity solidifying into a relatively firm pliable front layer, and the first volume of foam/gel in the first cavity solidifies into an integral relatively soft compressible cushion layer.

BRIEF DESCRIPTION OF THE DRAWINGS

The present invention may be more clearly understood with reference to the following detailed description, in conjunction with the appended drawings, in which:

FIG. 3 is a perspective view of an elongated formable cushion, produced in accordance with the present invention;

FIG. 4 is a perspective view of the cushion shown in FIG. 3 which has been shaped or formed into a particular form, by a user, the contour maintaining its shape until altered again by the user;

FIG. 5 shows a cross sectional view of the cushion shown in FIG. 3, taken along line 5—5;

FIG. 6 is an end view of the cushion as shown formed in FIG. 4 showing a selected contour made by manipulation of the formable cushion by a user;

FIG. 7 is a perspective view of the cushion shown in FIG. 3 broken away to show a formable member therein having a plurality of fingers, disposed transverse to a spine;

DETAILED DESCRIPTION

Figure 1:
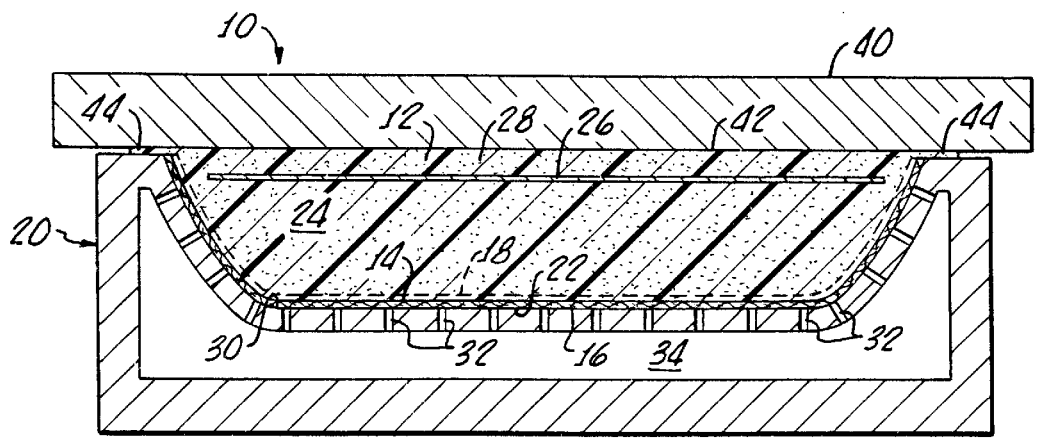
FIGS. 1 and 2 show apparatus suitable for producing a formable cushion in accordance with the present invention.

Turning now to FIG. 1, an apparatus 10 suitable for manufacturing a wrist support cushion 12 in accordance with the method of the present invention is shown in cross section. The method generally comprises the steps of coating one side 14 of a stretchable fabric 16 with gel or foam 18; disposing the fabric 16 over a mold 20; applying a vacuum between the fabric 16 and the mold 20 in order to cause intimate contact between an uncoated side 22 of the fabric 14 and the mold 20; depositing a first additional volume 24 of the foam/gel in a liquid state over the coated side 14 of the fabric 16 during the application of the vacuum; disposing a formable member 26 onto the first additional volume 24 of foam/gel; disposing a second additional volume 28 of foam/gel onto the member 26; allowing the additional volumes 24, 28 to solidify and adhere to the foam/gel coating 18 and member 26; and removing the solidified foam/gels 24, 28 and adhered fabric 16 and member 28 from the mold in order to obtain a cushion 12. The formable member is preferably a soft metal plate because of cost considerations. However, other formable materials may be utilized in accordance with the present invention Particularly, the fabric 16 may be a porous, four way stretch fabric, made of an elastomeric thread, preferably a segmented polyester-polyurethane, like that sold under the trade name "Lycra®", available from I.E. Dupont deNemours and Company. It should be appreciated that many other types of porous, stretchable materials, including porous films, may be used in the method of the present invention.

The gel coating 18, and the additional volumes 24, 28 both comprise a soft, easily molded composition. More particularly, the foam/gel 18, 24, 28 may comprise a thermoplastic compound having low fluid viscosity at elevated temperatures that can be injection molded and thereafter cooled to produce a rubbery, elastic foam or gel, for example, a thermoplastic elastomer.

After the step of coating the fabric 16, the fabric 16 is disposed over the mold 20, said mold 20 being adapted for vacuum forming the fabric 16. Importantly, the fabric 16 is disposed over the mold 20 such that the uncoated side 22 is placed in contact with thee mold 20, or more specifically, a molding surface contour 30. Thus, the foam/gel coated side 16 will be exposed during this step. In other words, the foam/gel coated side 16 will face away from the molding surface 28.

The mold 20 may be adapted for vacuum forming in any suitable, conventional manner. For example, the mold 20 may include vacuum ports 32 through the molding surface 28 and in communication with a hollowed cavity 34 to which a vacuum may be applied. The molding surface 28 is preferably elongated in shape, and the selected contour 30 thereof may be generally flat, curved or arcuate in form, depending upon the particular application of which the cushion 12 is to be used.

After placement of the fabric 16 over the mold 20, a vacuum is applied between the fabric 16 and the mold 20. Importantly, the foam/gel coating 18 renders the porous fabric 16 impermeable, or resistant, to the passage of air therethrough. Consequently, the fabric 16 is vacuum moldable even when fibers thereof (not shown) are substantially stretched apart.

In addition, the elasticity of the foam/gel enables substantial stretching of the foam/gel coating 18 without deterioration or breakage thereof, which would cause the coated fabric 16 to become air permeable, and thus resistant to vacuum forming. In effect, the present invention enables the fabric 16 to be optimally stretched and vacuum molded, thus creating a smooth, creaseless fabric surface defined by the selected contour 30 of the mold 20.

The vacuum may be applied in any suitable fashion. For example, a vacuum device (not shown) may be applied to evacuate the cavity 34, and consequently create a vacuum between the coated fabric 16 and the molding surface 30. Thus, the fabric 16 becomes four way stretched and forced into intimate contact with the molding surface 30.

During application of the vacuum, the additional volumes of foam/gel 24, 28 and plate 26 are deposited onto the fabric coating 18, by pouring or injecting said additional volumes 24, 28 into the mold 20, with the plate 26 therebetween.

As hereinabove noted, the foam/gel used for both the coating 18 and the additional volumes 24, 28 are preferably a thermoplastic elastomer and thus molded at an elevated temperature and then allowed to cool and set. Molding processing temperature will depend upon the particular thermoplastic composition being used, but will generally range from about 300° F. to about 500° F. or more.

After the additional volume 24 is deposited on the fabric coating 18, the total volume of foam/gel 18, 24, 28 is allowed to solidify. The solidified foam/gel 18, 14, 28 provides means for supporting the fabric 16 in the selected contour 30. Actual setting time will depend upon the particular foam/gel composition being used and the particular cooling means employed. The foam/gel 18, 24, 28 may be water cooled to produce rapid and uniform heat removal in order to minimize cycle time.

The completed cushion 12 is now ready for removal from the mold 20. The step of removing the solidified foam/gel 18, 14 and the coated fabric 16 fixed thereto may be performed by placing a rigid mat 40 flat against the mold 20 in order to cause contact between the rigid mat 40 and an exposed surface 42 of the solidified foam/gel 24. The tackiness of the solidified foam/gel 24 will cause it to adhere to the rigid mat 40, and thus upon lifting the mat 40 from the mold 20, the cushion 12 is lifted as well.

Next, the cushion 12 may be manually or otherwise peeled from the mat 40 and subsequently used, for example, as a wrist support. The final cushion 12 will have a soft fabric upper surface 22, vacuum formed in the selected contour 30, and an exposed lower surface 42 of foam/gel for enabling removable fastening of the cushion 12 to a selected surface, such as for example, a desk top (not shown).

Notably, the present invention may include the step of removing any extraneous portions 44 of solidified foam/gel 18, 24, for example, by cutting the extraneous portion 44 from the balance of the cushion 12. Preferably, in the depositing step, the additional volume 24 is sufficient to substantially or completely fill the mold 20 to capacity. This aids in easy removal from the mold 20 and the making of an attractive, uniform cushion 12. Thus, it is likely that in an attempt to fill the mold with the additional volume 24 of foam/gel, the mold may be overfilled, thus creating the extraneous portions 44, such as runners of excess foam/gel along mold edges 46. Any extraneous portion 44 may be cut from the balance of the cushion 12 while still in the mold 20.

Preferably, the step of cutting is included in the step of pressing the rigid mat 40 flat against the filled mold. Particularly, the rigid mat 40 may be pressed with sufficient force such that the extraneous portion 44 of solidified foam/gel is pinched between said mold edge 46 and the rigid mat 40, and severed from the balance of the gel 18, 24. Notably, any removed extraneous portion 44 of foam/gel may be recycled and used in the processing of another gel cushion, by melting the extraneous portion 44 back to a low viscosity state.

Referring now to FIGS. 3–7, the formable cushion 12 made through the use of the apparatus shown in FIG. 1, is illustrated showing a particular overall configuration of the cushion 12. It should be appreciated that any shape or dimensioned cushion may be produced in accordance with the present invention.

FIG. 3 shows a cushion 12 in an unformed or unshaped condition and FIG. 5 is a cross-sectional view taken along the line 5—5 more clearly showing the formable metal plate which may be, for example, a single sheet of 24 gauge steel disposed within the cushion 12 and between the gels 24, 28.

This metal plate enables the cushion 12 to be shaped or contoured as desired by a user as represented in the FIG. 4, and an end view shown in FIG. 6.

Because the metal plate 26 is malleable, thus may be bent, formed or shaped by the user, the end result is a cushion which can be conformed to any general contour as desired by the user.

In another embodiment 40, the present invention is shown in FIG. 7 which includes a metal plate 42 having a plurality of flat metal fingers 44 joined at one end thereof, to an elongated spine 50. Each metal finger 44 is formable along a direction transverse to the spine 50. In addition, the spine may be relatively rigid compared to the fingers by having a greater cross section. However, spaces 52 between fingers 44 enable the spine 50 to be foldable along a longitudinal axis 60 thereof.

In addition, the foam/gel 28 underlying the plate 42 as shown in FIG. 7, may comprise a foam/gel which solidifies to a relatively firm pliable back layer, while the volume of foam/gel 28 may be a foam/gel which solidifies to a relatively soft compressible material. In this manner, the back 62 of the cushion 40 is consistently firm with the plate 42, enabling forming of the cushion by the user as hereinabove described while maintaining a soft cushion for the use, which is provided by the foam/gel 24, underlying the fabric 16.

Regarding the foam/gel material reference made to U.S. Pat. No. 5,633,286 which is incorporated in toto herewith by this specific reference thereto for describing the types of polymers, for example, triblock copolymer elastomers, utilizing a plasticizing oil. Heating of the mold may include heating the mold to a temperature of between 150° and about 200° C.

Figure 2:
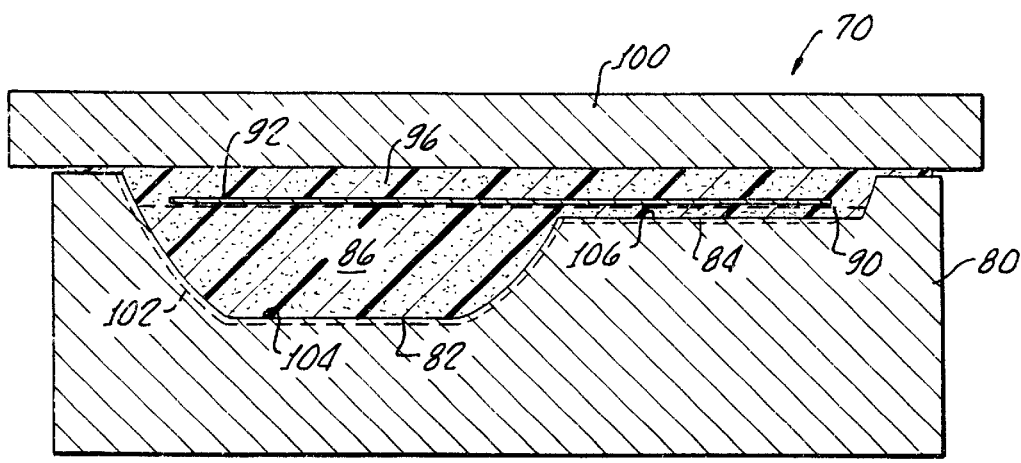
Figure 9:
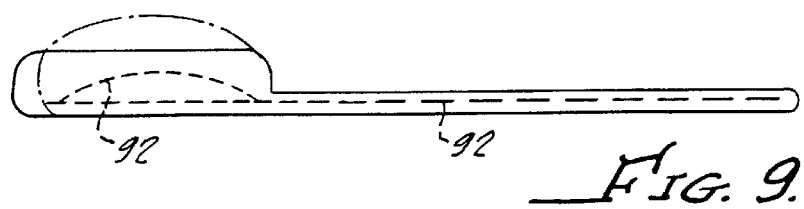
FIG. 9 is a cross sectional view of the formable gel cushion shown in FIG. 8, taken along the line 9—9 and showing a cushion portion being formed or shaped by a user for adapting the cushion to a comfortable shape selected by the users.

Utilizing these polymer materials, a single mold 70 as shown in FIG. 2, may be utilized to produce a cushion 72 shown in FIGS. 7 and 9, having a relatively firm stable flat portion 76, suitable for a mouse (not shown) attached to a relatively soft portion 78 which may be formed as hereinabove described in connection with the embodiments of 12 and 40.

With reference again to FIG. 2, the mold 70 may include a base portion 80 having a first cavity 82 and a second cavity 84 in fluid communication with one another, with the first cavity 82 having a depth greater than the second cavity 84.

A formable gel cushion 72 is formed by depositing a first volume 86 of foam/gel into the first and second cavities 82, 84 in an amount providing a level surface indicated by the dashed line 90 in FIG. 2.

Thereafter, the level surface 90 is covered with a formable sheet 92 and a second volume 96 of foam/gel is disposed on the formable sheet 92. Heat and pressure is applied via a plate 100 to set or gel the foam/gel into the shape of a mold.

Prior to disposing the gel 86 into the bottom 80, a fabric 102 shown in dashed line in FIG. 2 may be disposed within the mold similar to the fabric 16 described hereinabove in connection with the FIGS. 1 through 7. In addition, the mold 70 shown in FIG. 2 may be configured for utilizing a vacuum similar to the mold 20 shown in FIGS. 1–7.

Figure 8:
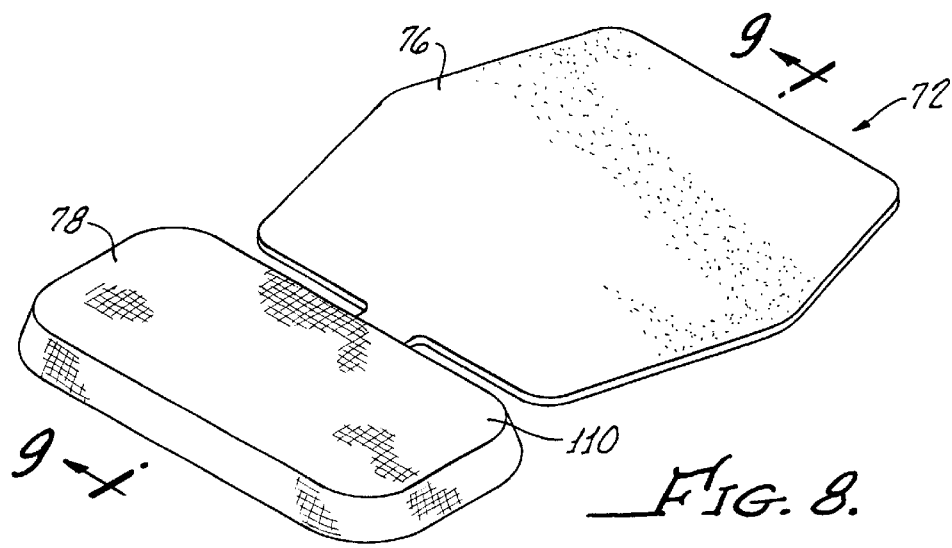
FIG. 8 is a perspective view of a formable mouse pad cushion in accordance with the present invention, made utilizing the apparatus shown in FIG. 2, which generally includes a flat mouse pad surface and a wrist cushion.

Alternatively, surfaces 104, 106 of the mold base 80 may be embossed with a texture so that a resulting surface 110 shown in FIG. 8 may be of any desired pattern, for example, a leather grain or the like.

The formable sheet 92 may be, for example, of 24 gauge malleable steel or the like, which enables contouring of the cushion 72 in a manner shown in FIG. 9 which is similar to the contouring of the cushion 12 hereinabove described.

Importantly, the formable sheet 92 may also provide a barrier to compression of the foam/gel 86 disposed in the first cavity 82, resulting in the second volume 86 of foam/gel solidifying to a relatively firm backing layer over the entire cushion 72.

In addition, the greater volume 82 enables the first volume 86 of foam/gel in the first cavity solidified into an integral relatively soft compressible cushion layer 78, while the first volume 86 between the moldable sheet 92 and the surface 106 of the first cavity solidifies to a relatively firm viable front layer.

The resulting mouse pad cushion is shown in FIG. 8 in which a single step operation enables the production of a relatively flat firm mouse pad surface 76 joined to a relatively soft formable cushion 78.

Figure 10:
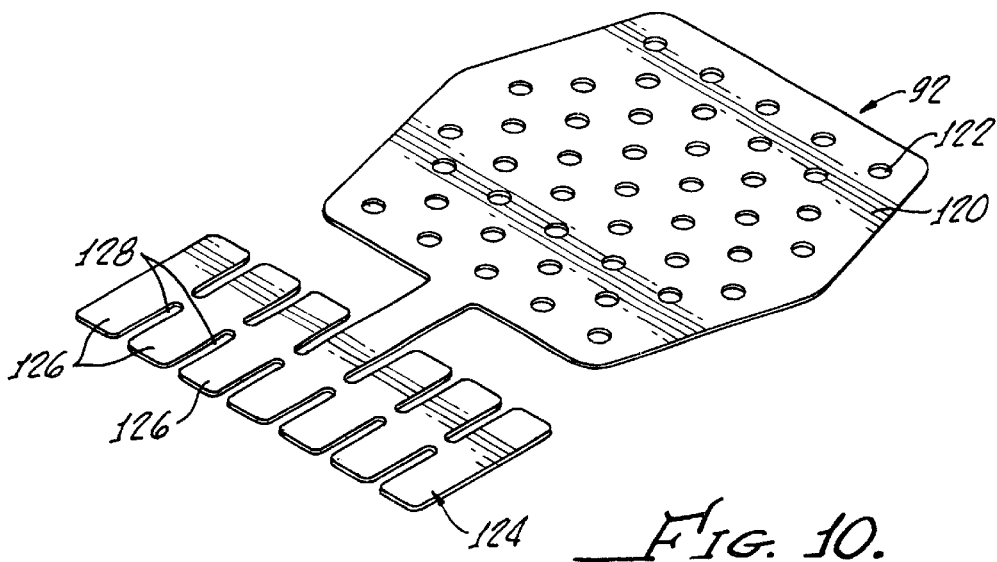
FIG. 10 is a perspective view of a formable member which may be utilized in the cushion shown in FIGS. 8 and 9 and represented in FIG. 9 by the dashed line.

This cushion is facilitated through the use of a formable sheet 92 as shown in FIG. 10, which includes a relatively flat portion 120 which may be a screen or have perforations 122 therein to cause commingling of the gel on either side thereof, as well as a portion 124 having fingers 126, with separations 128 therebetween, which enable and facilitate forming of the cushion 78 similar to the forming of the cushion 12 hereinabove described. Preferably, the relatively flat portion is relatively rigid to stabilize the mouse pad surface, or area, 76. In fact, the flat portion may be of a different relatively rigid material and attached to the formable sheet 92.

Although there has been hereinabove set forth a gel cushion and method of manufacturing the same in accordance with the present invention, for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A formable mouse pad cushion comprising:
    a first gel having a compressible cushion area and a mouse pad area extending therefrom;
    a second gel disposed under the first gel;
    a rigid member disposed between the first and second gels in the mouse pad area; and
    a formable member disposed in the cushion area and connected to said rigid member, for enabling a user to shape the cushion area to a desired form, said formable member comprising a plurality of flat fingers each joined only at one end thereof to an elongated spine, each finger being formable along a direction transverse to said spine.

2. The formable cushion according to claim 1 wherein said formable member comprises a single metal plate of 24 gauge steel.

3. The formable cushion according to claim 1 wherein said spine is rigid.

4. The formable cushion according to claim 1 wherein said spine is foldable along a longitudinal axis.

* * * * *